United States Patent
Vitrone

(10) Patent No.: US 7,267,319 B2
(45) Date of Patent: Sep. 11, 2007

(54) LOW-FRICTION SLIDE-PLATES FOR ROTARY MACHINES

(75) Inventor: Christen A. Vitrone, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 360 days.

(21) Appl. No.: 10/983,700

(22) Filed: Nov. 9, 2004

(65) Prior Publication Data
US 2006/0097126 A1 May 11, 2006

(51) Int. Cl.
*F16M 5/00* (2006.01)
(52) U.S. Cl. ............... 248/649; 248/679; 52/167.4
(58) Field of Classification Search ......... 248/637, 248/649, 678, 679; 60/686, 687; 165/67; 290/52; 52/167.4, 167.6, 167.9; 14/73.1; 417/359, 360
See application file for complete search history.

(56) References Cited

U.S. PATENT DOCUMENTS

| | | | |
|---|---|---|---|
| 2,531,178 A | 11/1950 | Van Nest | |
| 3,345,918 A | 10/1967 | Maurin | |
| 3,411,900 A | 11/1968 | Roeder et al. | |
| 3,561,379 A * | 2/1971 | Polsak | 588/321 |
| 3,582,007 A * | 6/1971 | Heighberger | 241/183 |
| 4,011,056 A | 3/1977 | Steine et al. | |
| 4,013,378 A | 3/1977 | Herzog | |
| 4,121,393 A | 10/1978 | Renault et al. | |
| 4,433,824 A * | 2/1984 | Koosha | 248/662 |
| 4,587,097 A | 5/1986 | Rabinkin et al. | |
| 4,592,204 A | 6/1986 | Rice | |
| 4,592,532 A * | 6/1986 | Stith, Jr. | 248/649 |
| 4,599,834 A | 7/1986 | Fujimoto et al. | |
| 4,643,645 A | 2/1987 | Robbins et al. | |
| 4,784,364 A * | 11/1988 | Chamberlain et al. | 248/673 |
| 4,961,310 A | 10/1990 | Moore et al. | |
| 5,016,338 A * | 5/1991 | Rowan, Jr. | 29/423 |
| 5,110,082 A * | 5/1992 | Rowan, Jr. | 248/678 |
| 5,379,563 A * | 1/1995 | Tinsley | 52/295 |
| 5,762,312 A | 6/1998 | Whittaker et al. | |
| 5,796,189 A | 8/1998 | Manning et al. | |
| 5,975,480 A * | 11/1999 | Schaefer et al. | 248/678 |
| 6,324,795 B1 * | 12/2001 | Stiles et al. | 52/167.4 |
| 6,405,992 B1 * | 6/2002 | Palmer | 248/679 |

(Continued)

FOREIGN PATENT DOCUMENTS

EP 1300548 4/2003

OTHER PUBLICATIONS

Rupert, W.D., "Braze Life After Cadmium," *Welding Journal*, American Welding Society, vol. 74, No. 11 (Nov. 1995), pp. 59-61.

(Continued)

*Primary Examiner*—Korie Chan
(74) *Attorney, Agent, or Firm*—Nixon & Vanderhye, PC

(57) ABSTRACT

A mounting arrangement for use at an interface between a movable machine component and a stationary foundation includes a substantially planar foundation plate adapted for attachment to the foundation; and a plurality of slide-plate assemblies secured to the foundation plate, each slide-plate assembly comprising a mounting plate, a backing plate, and a low-friction pad overlying the backing plate, the plurality of slide-plate assemblies adapted to engage a footplate of the movable machine component.

10 Claims, 4 Drawing Sheets

U.S. PATENT DOCUMENTS

| | | |
|---|---|---|
| 6,419,448 B1 | 7/2002 | Owczarek |
| 6,450,782 B1 * | 9/2002 | Sakamoto .................. 417/359 |
| 6,554,542 B2 * | 4/2003 | Mano et al. ................ 405/251 |
| 6,784,573 B1 | 8/2004 | Iversen et al. |
| 2003/0061819 A1 | 4/2003 | Hidetoshi et al. |

OTHER PUBLICATIONS

European Search Report No. EP 05 25 6997, by Examiner De Backer on Feb. 21, 2006, in Munich.

* cited by examiner

US 7,267,319 B2

LOW-FRICTION SLIDE-PLATES FOR ROTARY MACHINES

BACKGROUND OF THE INVENTION

This invention relates to slide-plates that allow relative movement between two surfaces with minimal friction, and in particular, slide-plates used at the interface between large rotating machinery components and a stationary foundation.

In large rotary machines such as steam turbines, an associated exhaust hood must be permitted to move axially due to thermal expansion of the steam turbine. Typical exhaust hood thermal expansion is on the order of about ¼ inch, but larger machines may move as much as 1.25 inches. The exhaust hood supports one of the turbine bearings and the low pressure rotor which are sensitive to exhaust hood deflections. As a result, the sliding interface must not negatively impact the bearing stiffness, and must not change elevation over the sliding span.

Current slide-plate techniques includes the use of greased metallic plates as well as flexible vertical plates called "flex legs." However, such techniques impart large forces on the turbine components due to weight, coefficient of friction, and/or large displacements.

BRIEF DESCRIPTION OF THE INVENTION

This invention solves the above problem by utilizing slide-plate assemblies incorporating self-aligning low-friction pads. More specifically, each of a plurality of slide-plate assemblies includes a mounting plate formed with a spherical seat, a backing plate overlying the spherical seat, and a low-friction lower sliding element or pad. These slide-plate assemblies transmit the entire vertical loading from the exhaust hood casing to the foundation.

In the exemplary embodiment, a slide-plate assembly foundation plate is secured (e.g., grouted) within a pocket provided in the stationary foundation. This plate contains slots for receiving one or more axially aligned keys. The keys cooperate with one or more aligned slots in the exhaust hood footplate and serve to guide the exhaust hood during thermal expansion, and also to transfer lateral loads from the casing to the foundation. In addition, through-holes and slots are provided in the foundation plate and in the hood footplate, respectively, to allow anchor bolts and washers to restrict uplift of the exhaust hood while at the same time permitting axial movement. A peripheral or surrounding shield mechanism may be employed to prevent the entry of dirt and/or debris and moisture into the cavity between the hood footplate and the foundation plate.

A plurality of stainless steel upper sliding elements may be attached to the underside of the exhaust hood footplate for direct interaction with the low-friction pads of the slide-plate. In the exemplary embodiment, the low-friction pad is constructed of polytetrafluoroethyelene (preferably Teflon®).

Accordingly, in its broader aspects, the present invention relates to a mounting arrangement for use at an interface between a movable machine component and a stationary foundation comprising a substantially planar foundation plate adapted for attachment to the foundation; and a plurality of slide-plate assemblies secured to the foundation plate, each slide-plate assembly comprising a mounting plate, a backing plate, and a low-friction pad overlying the backing plate, the plurality of slide-plate assemblies adapted to engage a footplate of the movable machine component.

In another aspect, the present invention relates to a mounting arrangement for use at an interface between a movable machine component and a stationary foundation comprising a substantially planar foundation plate adapted for attachment to the foundation; and a plurality of slide-plate assemblies secured to the foundation plate, each slide-plate assembly comprising a mounting plate, a backing plate secured to the mounting plate, and a low-friction pad overlying the backing plate; wherein the low-friction pad is comprised of polytetrafluorethylene; and wherein the mounting plate is provided with a part-spherical seat located between the low-friction pad and the backing plate.

In another aspect, the present invention relates to an exhaust hood and foundation assembly for a steam turbine comprising an exhaust hood component provided with a substantially planar footplate; and a foundation plate secured to a stationary foundation wherein the foundation plate has a plurality of multi-layer slide-plate assemblies thereon for interfacing with the planar footplate.

In still another aspect, the present invention relates to an exhaust hood and foundation assembly for a steam turbine comprising an exhaust hood component provided with a substantially planar footplate; and a foundation plate secured to a stationary foundation wherein the foundation plate has a plurality of multi-layer low-friction slide-plate assemblies thereon for interfacing with the planar footplate; wherein each multi-layer low-friction slide-plate assembly comprises a mounting plate, a backing plate secured to the mounting plate, and a low-friction pad overlying the backing plate; wherein the low-friction pad is comprised of polytetrafluorethylene; and wherein the mounting plate is provided with a part-spherical seat and wherein the backing plate overlies the part-spherical seat.

The invention will now be described in detail in connection with the drawings identified below.

DETAILED DESCRIPTION OF THE INVENTION

Figure 1:
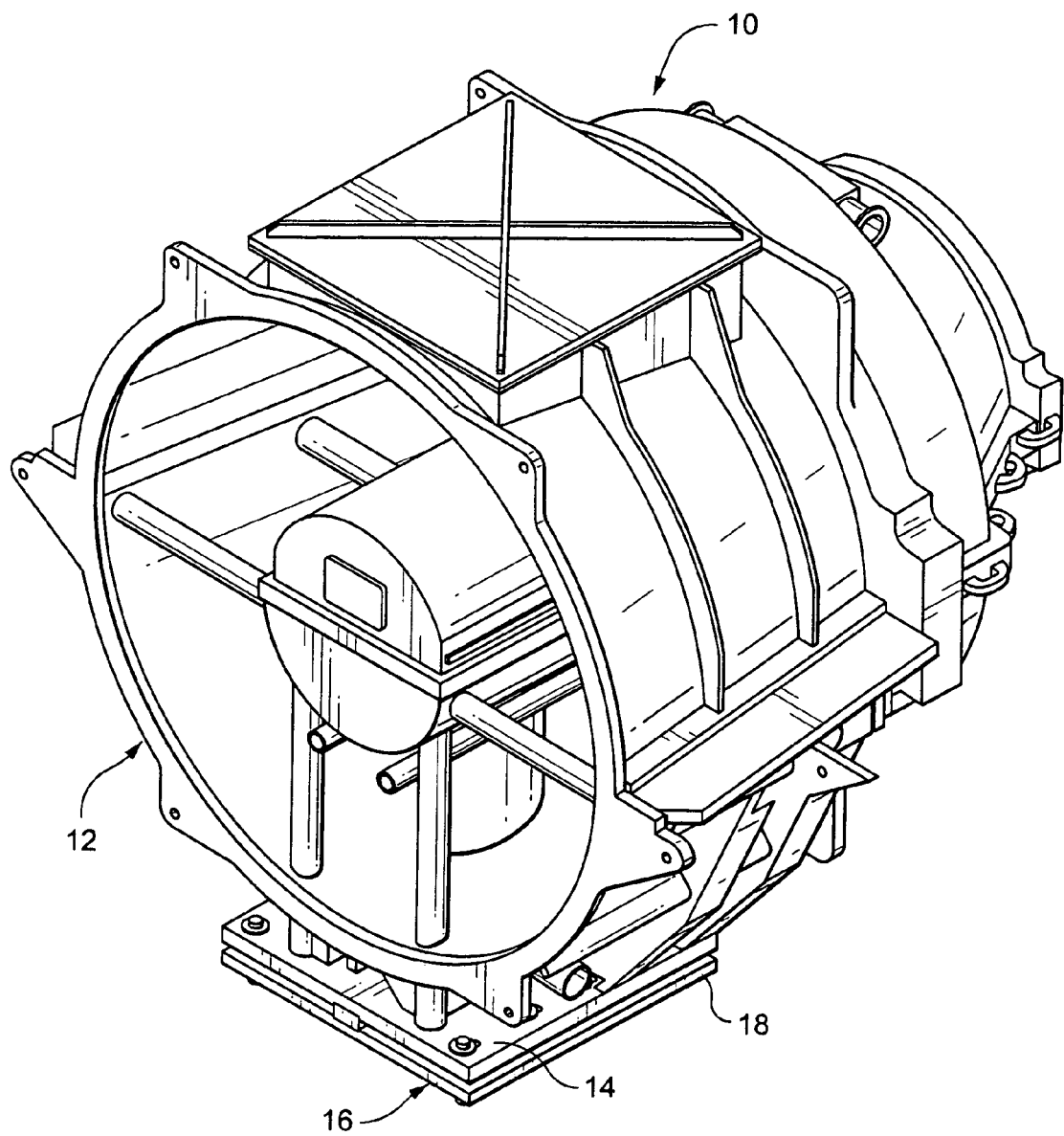
FIG. 1 is a perspective view of a typical exhaust hood mounted on a foundation plate equipped with self-aligning, low-friction slide-plate assemblies in accordance with an exemplary embodiment of the invention.
Figure 2:
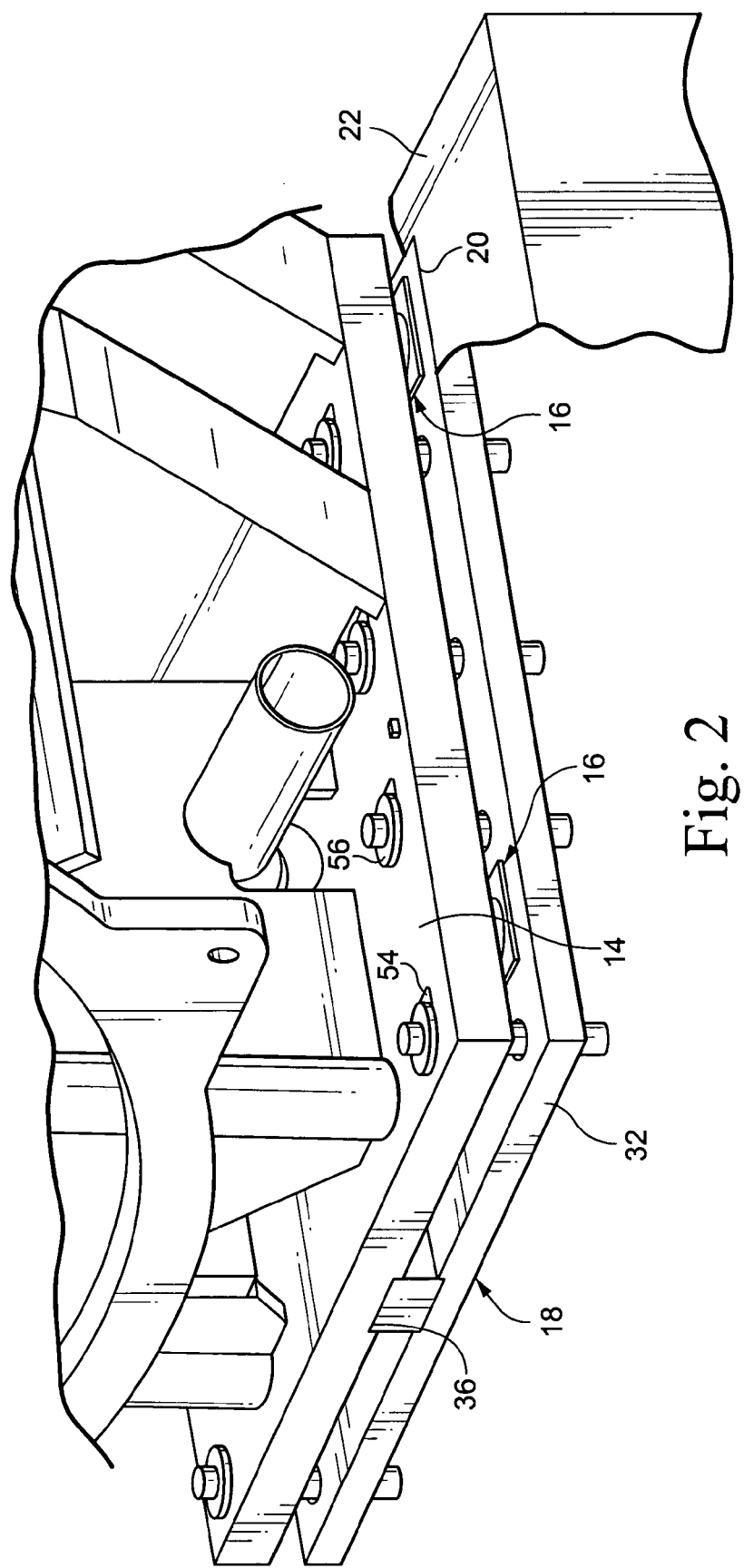
FIG. 2 is an enlarged detail taken from FIG. 1.

With initial reference to FIGS. 1 and 2, an exhaust hood 10 for a steam turbine (not shown) includes a generally cylindrical casing 12 to which a relatively flat (i.e., substantially planar) footplate 14 is securely attached by bolts or the like. Referring now also to FIG. 2, the footplate 14 is designed to interact with a plurality of low-friction slide-plate assemblies 16 mounted on a foundation plate 18 that is grouted into, and thus rigidly secured within, a pocket or recess 20 in a stable and stationary foundation (typically concrete) 22.

Figure 3:
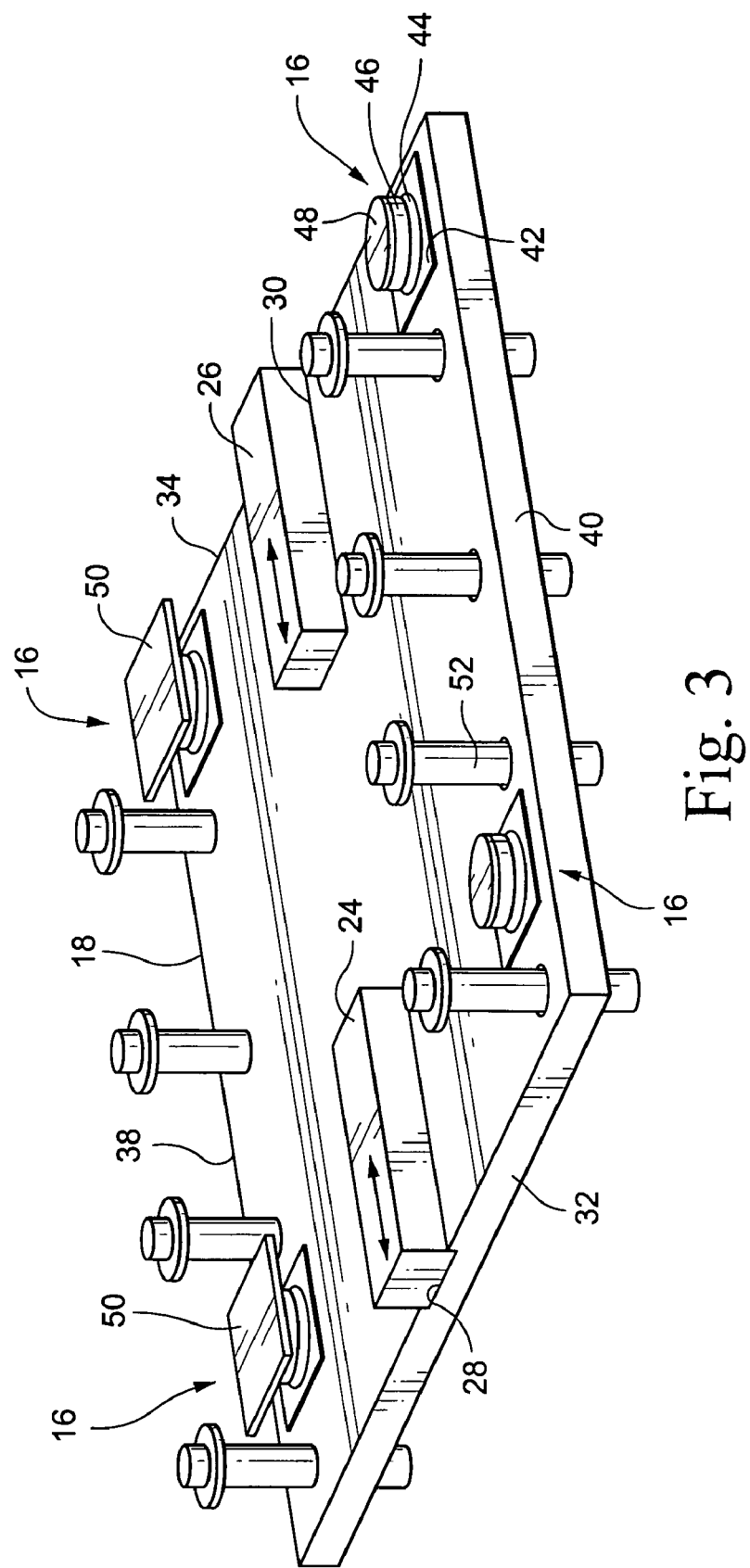
FIG. 3 is a perspective view of the foundation plate partially shown in FIGS. 1 and 2, incorporating low-friction pads in accordance with the exemplary embodiment of the invention.

The foundation plate 18 is also a substantially flat, i.e., substantially planar, member that is generally commensurate in size with the exhaust hood footplate 14. As best seen in FIG. 3, the foundation plate 18 is provided with a pair of centrally located, axially extending, elongated keys 24, 26 seated in corresponding grooves 28, 30, each of which abut a respective edge 32, 34 of the foundation plate 18. These keys 24, 26 are adapted to seat within corresponding grooves or slots 36 (one shown in FIG. 2) formed in the underside of the footplate 14.

Figure 4:
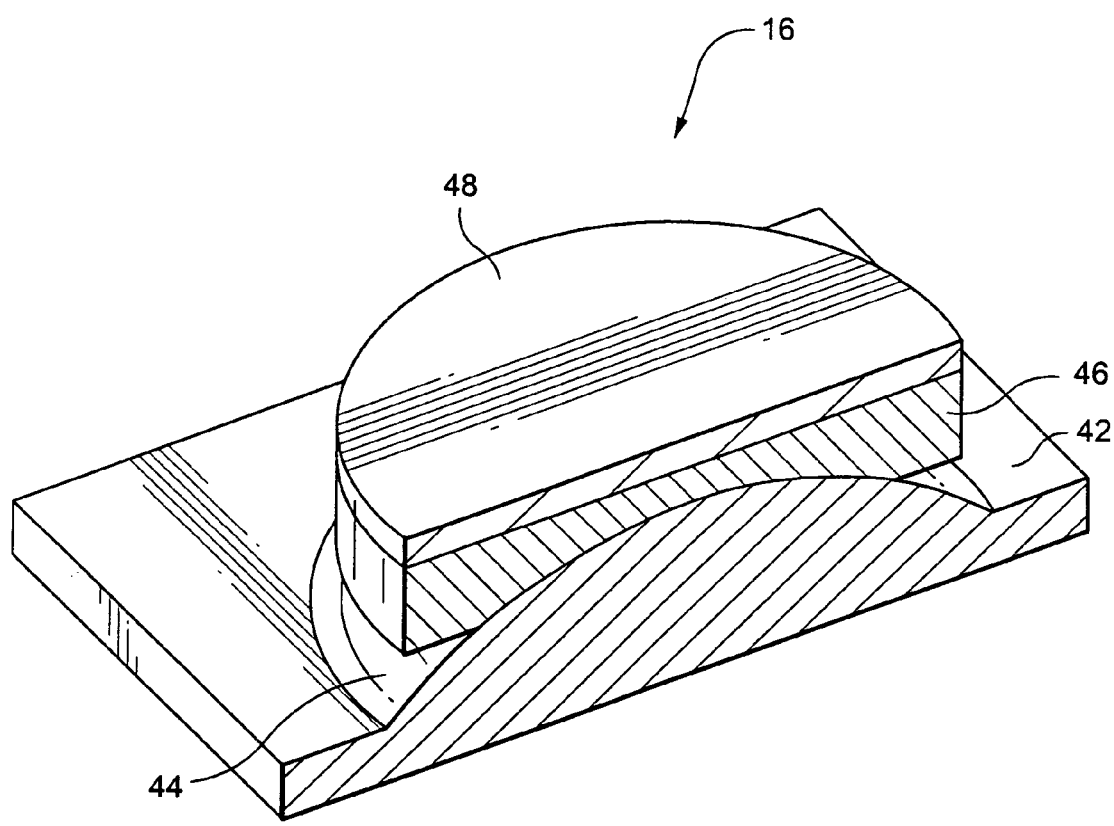
FIG. 4 is a perspective view, partially in cross section, illustrating a low-friction pad of the type used in FIGS. 1-3.

The slide-plate assemblies 16 are located at spaced locations along side edges 38, 40 of the foundation plate 18. The plural slide-plate assemblies 16 are identical, and each includes a flat mounting plate 42 secured to the upper surface of the foundation plate 18. The mounting plate is provided with a part-spherical seat 44 (FIG. 4) centrally located on the mounting plate 42. A backing plate 46 overlies the seat 44, with the underside of the backing plate 46 shaped to mate with the part-spherical seat. Overlying the backing plate 46, there is a low-friction pad 48 that may be composed of polytetrafluoroethylene (preferably Teflon®). Flat plates 50 are shown overlying two of the low-friction pads 48, but it will be understood that the plates 50 are mounted on the underside of the footplate 14. They are shown in FIG. 3 to illustrate the manner in which the plates 50 are aligned with and directly engage the slide-plate assemblies 16 via low-friction pads 48.

A plurality of bolts or other suitable fasteners 52 extend through the foundation plate 18 and are loosely secured within elongated apertures 54 in the exhaust hood footplate 14 via oversized washers 56 and nuts (not shown), as best seen in FIG. 2. This arrangement prevents uplift of the exhaust hood 10 from the foundation plate 18 but at the same time, permits thermal expansion of the exhaust hood 10 and footplate 14 in the longitudinal directions indicated by the arrows on the keys 24, 26 in FIG. 3 with minimal friction.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mounting arrangement for use at an interface between a movable machine component and a stationary foundation comprising:
    a substantially planar foundation plate adapted for attachment to the foundation wherein said foundation plate is provided with at least one elongated key adapted to cooperate with a corresponding keyway on the footplate of the machine component for guiding the machine component during thermal expansion; and
    a plurality of slide-plate assemblies secured to the foundation plate, each slide-plate assembly comprising a mounting plate, a backing plate, and a low-friction pad overlying the backing plate, said plurality of slide-plate assemblies adapted to engage a footplate of the movable machine component.

2. The mounting arrangement of claim 1 wherein said low-friction pad is comprised of polytetrafluoroethylene.

3. The mounting arrangement of claim 1 wherein the foundation plate is provided with a plurality of upwardly projecting anchor bolts adapted for operative attachment to the footplate of the machine component.

4. The mounting arrangement of claim 1 wherein said mounting plate of each of said plurality of mounting plate assemblies is provided with a part-spherical seat and wherein said backing plate overlies and is secured to the part-spherical seat.

5. A mounting arrangement for use at an interface between a movable machine component and a stationary foundation comprising:
    a substantially planar foundation plate adapted for attachment to the foundation wherein said foundation plate is provided with at least one elongated key adapted to cooperate with a corresponding keyway on a footplate of the machine component for guiding the machine component during thermal expansion; and
    a plurality of slide-plate assemblies secured to the foundation plate, each slide-plate assembly comprising a mounting plate, a backing plate secured to the mounting plate, and a low-friction pad overlying the backing plate; wherein said low-friction pad is comprised of polytetrafluorethylene; and wherein said mounting plate of each of said plurality of mounting plate assemblies is provided with a part-spherical seat located between said low-friction pad and said backing plate.

6. The mounting arrangement of claim 5 wherein the foundation plate is provided with a plurality of upwardly projecting anchor bolts adapted for operative attachment to the footplate of the machine component.

7. An exhaust hood and foundation assembly for a steam turbine comprising an exhaust hood component provided with a substantially planar footplate; and a foundation plate secured to a stationary foundation wherein said foundation plate has a plurality of multi-layer slide-plate assemblies thereon for interfacing with said planar footplate, each multi-layer slide-plate assembly comprising a mounting plate, a backing plate, and a low-friction pad overlying the backing plate; and wherein said foundation plate is provided with at least one elongated key cooperating with a corresponding keyway on a footplate of the exhaust hood component for guiding the exhaust hood component upon thermal expansion of the steam turbine.

8. The exhaust hood and foundation assembly of claim 7 wherein said low-friction pad is comprised of polytetrafluorethylene.

9. The exhaust hood and foundation assembly of claim 7 wherein the foundation plate is provided with a plurality of upwardly projecting anchor bolts operatively attached to the footplate of the exhaust hood component, and wherein elongated holes are provided in the footplate for receiving the anchor bolts.

10. The exhaust hood and foundation assembly of claim 7 wherein said mounting plate of each slide-plate assembly is provided with a part-spherical seat and wherein said backing plate is secured to the part-spherical seat.

* * * * *